United States Patent [19]
Ohhashi et al.

[11] Patent Number: 5,355,482
[45] Date of Patent: Oct. 11, 1994

[54] APPARATUS AND METHOD FOR CONTROLLING A SYSTEM PROCESS

[75] Inventors: Akihiro Ohhashi; Tadashi Okamoto; Makoto Tachikawa; Takeshi Katoh, all of Hitachi; Noboru Azusawa, Katsuta; Junichi Hamano, Yokohama; Hitoshi Saitoh, Hitachi, all of Japan

[73] Assignees: Hitachi, Ltd., Tokyo; Hitachi Information & Control Systems, Inc., Hitachi, both of Japan

[21] Appl. No.: 679,315

[22] Filed: Apr. 2, 1991

[30] Foreign Application Priority Data

Apr. 2, 1990 [JP] Japan ................... 2-87733

[51] Int. Cl.⁵ .................................. G06F 9/00
[52] U.S. Cl. ................... 395/650; 364/DIG. 2; 364/917.2; 364/131; 364/138; 364/147
[58] Field of Search ............... 395/650; 364/DIG. 2, 364/917.2, 131, 138, 147, 221.9

[56] References Cited

U.S. PATENT DOCUMENTS

| 4,742,443 | 5/1988 | Rohn et al. | 364/136 |
| 4,941,081 | 7/1990 | Kumar et al. | 364/140 |
| 5,005,152 | 4/1991 | Knutsen | 364/900 |
| 5,042,002 | 8/1991 | Zink et al. | 364/900 |
| 5,068,778 | 11/1991 | Kosem et al. | 364/138 |
| 5,097,405 | 3/1992 | Sato | 364/140 |

OTHER PUBLICATIONS

Yaskawa, 1989, "Control Pack CP 3300".

Primary Examiner—Gareth D. Shaw
Assistant Examiner—A. Katbab
Attorney, Agent, or Firm—Antonelli, Terry, Stout & Kraus

[57] ABSTRACT

A process controlling method uses a flowchart language program and ladder programs with an intermediate register to be accessible with the same name by both the flowchart language program and the ladder programs. Each ladder program defines the operation of a machine, including an interlock condition or the like of the machine operation. The flowchart language program defines an automatic operation flow which sequentially activates the ladder programs using the data in the intermediate register. This arrangement allows the flowchart language program to be separated from the ladder programs, thereby improving productivity, serviceability and security of the programs.

8 Claims, 8 Drawing Sheets

APPARATUS AND METHOD FOR CONTROLLING A SYSTEM PROCESS

BACKGROUND OF THE INVENTION

1. Field of the Invention

The present invention relates to a process controlling method and a controller, and more particularly to a method for creating, structuring and executing programs in the controller.

2. Description of the Related Art

A method for combining a ladder program with a flowchart language program is disclosed in "Yaskawa Denki" vol. 53 No. 203 '89.2 (hereinafter referred to as a known example 1)' in which the flowchart language program is activated by the ladder program when a trouble has occurred.

U.S. Pat. No. 4,742,443 (hereinafter referred to as a known example 2) discloses a method for dividing a large control task into a plurality of control steps to be sequentially executed so as to define each control step using a separate ladder program while defining the procedure, according to which the control steps are to be executed, using a structure chart program.

Referring to the known example 1, the ladder program defines the whole flow of a program and the structural form of the program is not taken into consideration. Consequently, the following problems are caused: Even after completion of creating a program, an actual machine test cannot be carried out until the program is installed into a system. It is difficult to execute the parallel work for program development. It is hard to carry out separation of the system when troubles have occurred. Know-how of machine operation and that of production flow are included in the same program so that it is difficult to keep information confidential.

Referring to the known example 2, the program is structured. However, no means for manual control of machines is disclosed. The ladder programs do not include means for manually controlling the machines. Consequently, it is difficult to separate the ladder programs from the flowchart language program so as to execute the actual machine tests of the ladder programs. Furthermore, it is hard to cope with troubles. In addition, the structure chart program and the ladder programs are not to be executed in parallel but to be executed sequentially. Accordingly, it is difficult to perform processes such as management of a waiting time using the structure chart program while executing the ladder programs.

SUMMARY OF THE INVENTION

It is an object of the present invention to provide a process controlling method and a controller wherein the control of the flow of all control objects and that of each control object are divided into separate control programs so that the productivity, serviceability and security of the control programs can be improved.

It is another object of the present invention to provide a process controlling method and a controller wherein ladder programs, which are independent for each control object, are described and include automatic-manual switching means so that the maintenance and secrecy of the control programs can be improved.

It is yet another object of the present invention to provide a process controlling method and a controller wherein a flowchart language program and the ladder programs can be executed in parallel so as to easily perform time management or the like.

The present invention provides a process controlling method for fetching data related to control objects and controlling the control objects in accordance with the data, the method comprising steps of defining the whole flow, which controls the control objects in accordance with a flowchart language program, defining operations of the control objects by ladder programs, respectively, and providing a set of contacts in the ladder programs such that the set of the contacts allow the control objects to be controlled in accordance with the results of execution of the flowchart language program in automatic operation and to be controlled in accordance with manual switches irrespective of the results of execution for the flowchart language program in manual operation.

Furthermore, the present invention provides another process controlling method for fetching data related to control objects and controlling the control objects in accordance with the data, the method comprising steps of providing a flowchart language program for defining the whole flow which controls the control objects, providing ladder programs each for creating control data which controls each control object using, as operating conditions, the fetched data related to the control objects and the results of execution of the flowchart language program, and executing the ladder programs in parallel with the flowchart language program. Thus, there may exist a two level hierarchical program system in which the flowchart language program defines the whole flow and the ladder programs define objects specific flow.

According to the process controlling method mentioned above, the results of execution of the ladder programs may be fetched as the operating conditions of the flowchart language program.

Preferably, each ladder program includes contacts for at least one of a troubleshooting and an interlock that are inherent in the control object.

The present invention further provides a controller for fetching data related to control objects and outputting control data which controls the control objects in accordance with the data, the controller comprising first storage means for storing a flowchart language program which defines the whole flow of automatic operation for the control objects, a first processor for executing the flowchart language program which is stored in the first storage means, second storage means for storing a plurality of ladder programs which control the operations of the control objects in accordance with the flow of the flowchart language program in automatic operation and in accordance with a manual switch in manual operation, a second processor for executing the ladder programs stored in the second storage means, and third storage means including a storage area which the first and second processors can access for transferring information therebetween.

Preferably, the third storage means further may include a storage area into which the output and/or input status of a sensor and/or a switch is written and the processors execute the respective programs with reference to the storage area.

According to the present invention, the flowchart language program defines the control procedure of all control objects in automatic operation while the ladder programs define the contents of control for the actual operations of the control objects. Each independent ladder program is defined so as to be completed for each control object (i.e., each ladder program controls only one control object). Both the flowchart language program and the ladder programs are simultaneously executed by separate processors in parallel with each other. The third storage means (an intermediate register to be described below) functions as information transfer means between the ladder programs and the flowchart language program, the ladder programs and the flowchart language program being synchronized with each other by the third storage means. In other words, the results of execution of either of the programs can be used as the operating conditions for the other. Consequently, the flowchart language program and the ladder programs, which are separately operated by two processors, are made to cooperate with each other so that the control objects can smoothly be controlled in automatic operation.

Furthermore, each ladder program includes contacts which are turned on and off by an automatic-manual switch for changing over the automatic and manual operations. With the contacts, the flowchart language program can be connected to or separated from the ladder programs. Each ladder program controls the operation of a specific control object. In manual operation, each control object can be controlled by a manual switch or the like irrespective of the results of execution of the flowchart language program with no change in the program logic. Thus, the ladder programs can be separated from the flowchart language program so as to allow parallel programming and separate actual machine test, thereby improving the productivity, serviceability and security of the programs.

These and other objects, features and advantages of the present invention will become more apparent upon reading of the following detailed description and drawings.

DETAILED DESCRIPTION OF THE PREFERRED EMBODIMENTS

Figure 1:
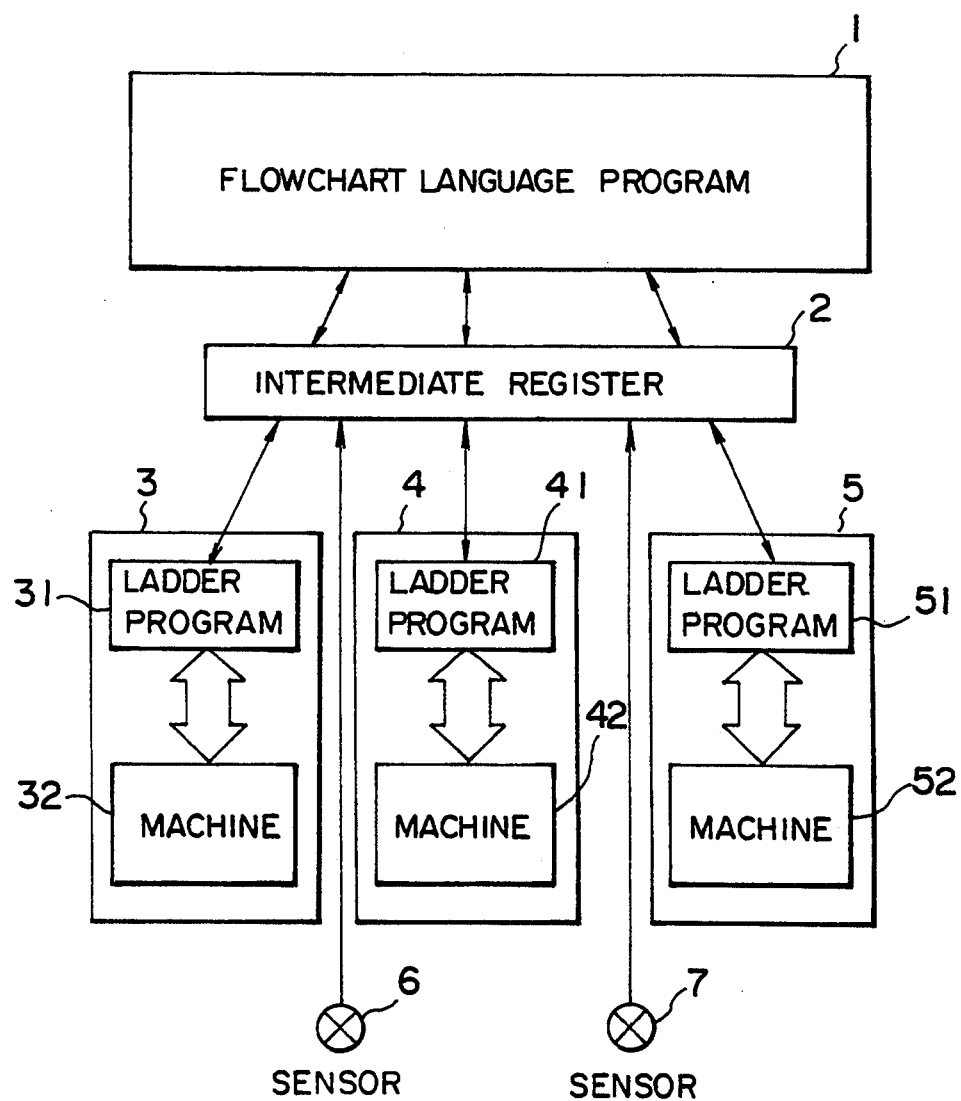
FIG. 1 is a block diagram showing the whole system including machines of control objects and control programs according to the present invention.

FIG. 1 shows the construction of the whole system which includes control programs and machines to be controlled according to the present invention.

The system includes machines 32, 42 and 52, ladder programs 31, 41 and 51 for controlling the respective machines, a flowchart language program 1, an intermediate register 2 from and to which data can be read and written by the programs, sensors 6 and 7, and the like.

The flowchart language program 1 defines the whole flow for controlling machines 3, 4 and 5 with the ladder programs in response to inputs from the sensors 6 and 7, and the like. The flowchart language program 1 is executed by a flowchart language processor (to be described below with reference to FIG. 4).

The ladder programs define the processing of the respective machines. In other words, the ladder programs 31, 41 and 51 define the processing of the machines 32, 42 and 52, respectively. The ladder programs are sequentially and periodically executed each for a short time by means of a ladder processor (to be described below with reference to FIG. 4) in parallel with execution of the flowchart language program.

Figure 2:
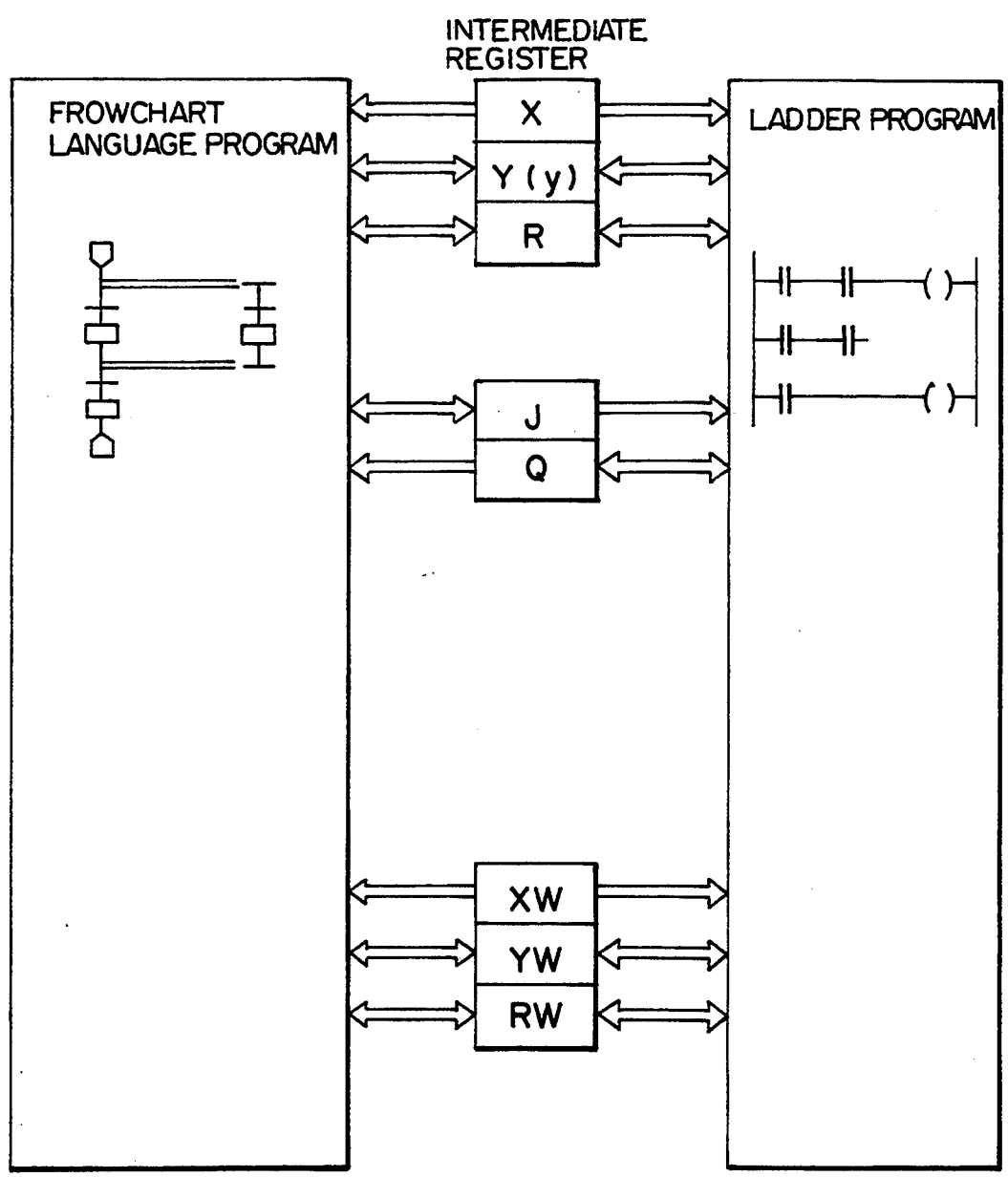
FIG. 2 is a block diagram showing the construction of an intermediate register shown in FIG. 1.

FIG. 2 shows the construction of the intermediate register 2 shown in FIG. 1.

The intermediate register 2 can be accessed by the flowchart language program and the ladder programs under common designations (for example, X, Y, R and the like). The designations and functions of the intermediate register 2 are as follows:

X: an external actual contact input from the machines and the like,

Y: an external actual contact output to the machines and the like,

R: an internal register,

J: a transfer register for transferring information from the flowchart language program to the ladder programs, Q: a receive register for transferring information from the ladder programs to the flowchart language program, XW: an external input word register, YW: an external output word register, and RW: an internal word register.

It should be noted that FIG. 2 shows one example of the intermediate register 2, to the designations, types and number of which is not limited.

Figure 3:
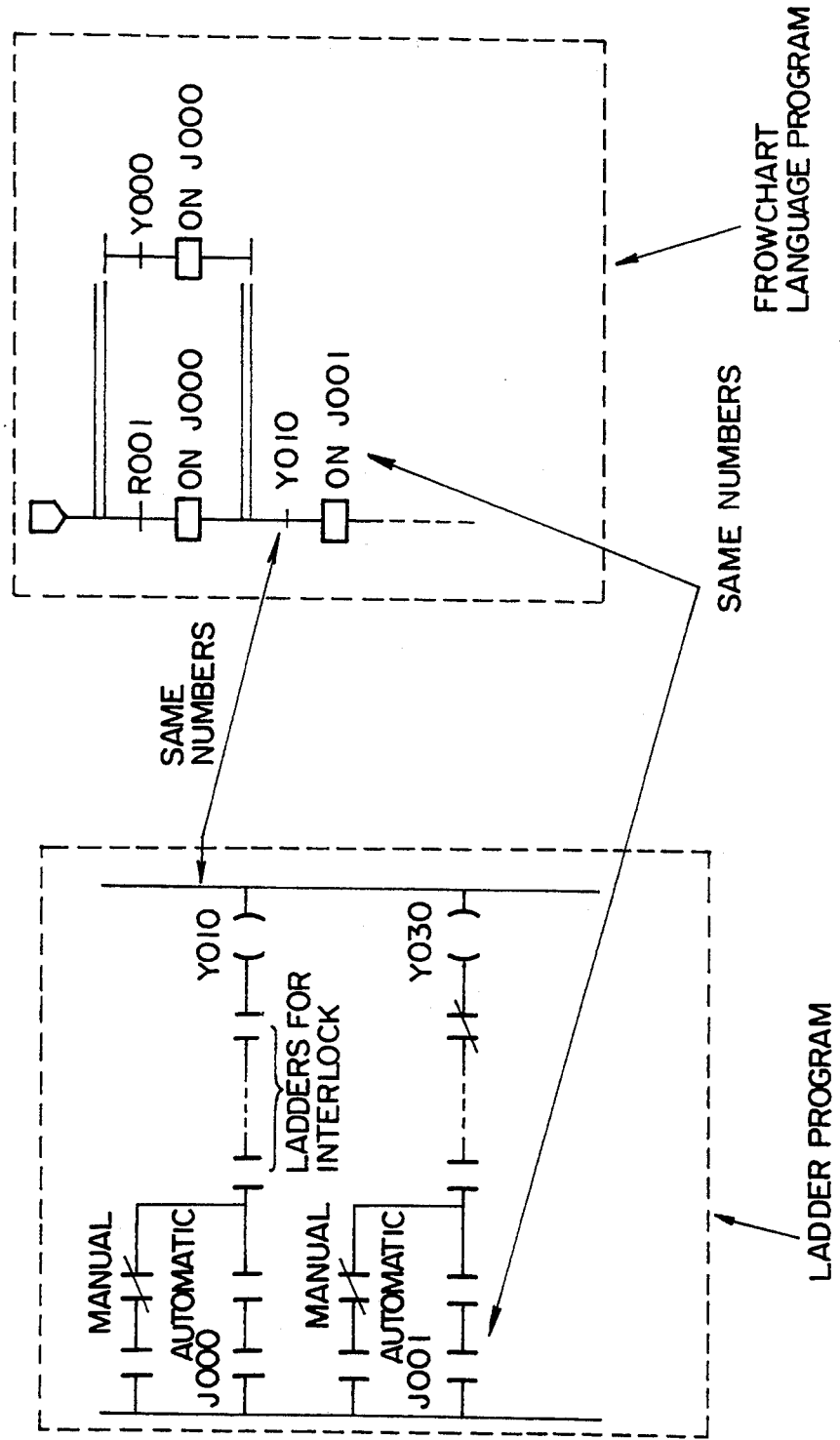
FIG. 3 is a view for explaining one example of the combination of ladder programs and a flowchart language program.

FIG. 3 shows an example in which the ladder programs and the flowchart language program are adapted to have a hierarchical structure with the intermediate register.

In creation of the ladder programs, a ladder program is created including manual conditions and interlocks for each execution number of the flowchart language program. In this case, an 'automatic' contact is inputted using the transfer register in the form of J . . . correspondingly to an execution number of the flowchart language program. In the flowchart language program, the flow of the whole process in automatic operation is described by the transfer registers J . . . in such a manner that the ladder programs are activated by outputs of the flowchart language program.

Thus, a control program having a 2-hierarchical structure can be obtained by using the intermediate register.

Figure 4:
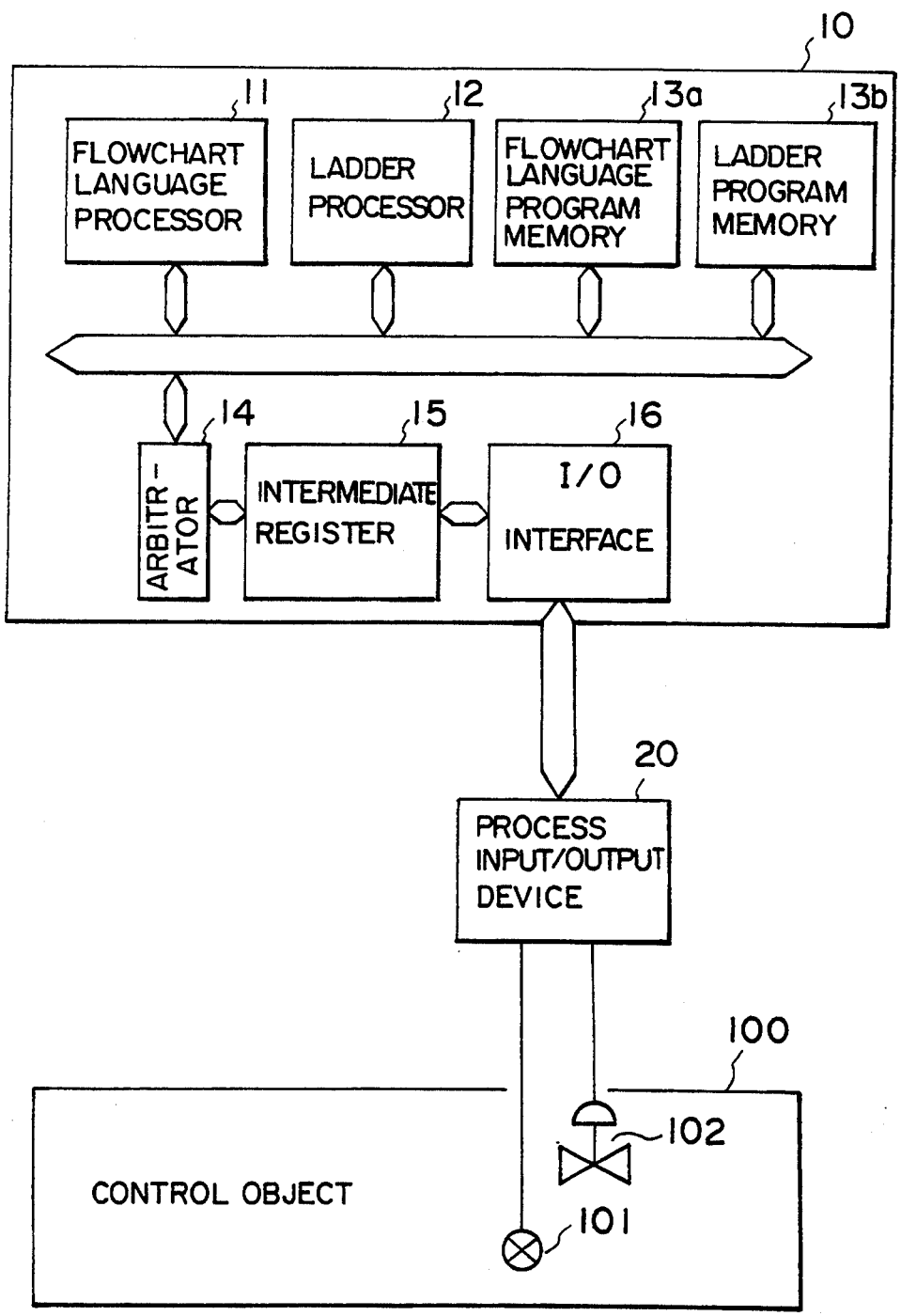
FIG. 4 is a block diagram showing the construction of a controller for program control according to the present invention.

FIG. 4 shows one example of a controller for executing the programs shown in FIG. 3.

A controller 10 includes processors 11 and 12, memories 13a and 13b, an arbitrator circuit 14, an intermediate register 15 and an I/O interface 16. The processors 11 and 12 execute the flowchart language program and the ladder programs, respectively. The memories 13a and 13b store the flowchart language program and the ladder programs, respectively. The intermediate register 15 serves as storage areas to which both the processors 11 and 12 can access. The arbitrator circuit 14 arbitrates collision of accesses of the processors 11 and 12 to the intermediate register 15. The controller 10 is connected to a process input-output device 20 through the I/O interface 16. The process input-output device 20 is connected to a control object 100 through a sensor 101 and an actuator 102.

The status of the control object 100 is input from the sensor 101 to the controller 10 through the process input-output device 20. In the controller 10, input signals are stored as process values in the intermediate register 15 through the I/O interface 16. The flowchart language processor 11 and the ladder processor 12 fetch the process values from the intermediate register 15 and executes operations thereon in order to approximate a value to be controlled of the process to a target value, so that control parameters of the process is stored in the intermediate register 15. Signals of the control quantity stored in the intermediate register 15 are output from the controller 10 to the process input-output device 20 through the I/O interface 16. The control parameters are transferred through the process input-output device 20 to the actuator 102 so as to control the control objects 100.

According to the present embodiment, the following advantages can be obtained.

(1) It is possible to carry out parallel works for creating the ladder programs which directly control the machines and for creating the flowchart language program which controls the automatic operation of production flow.

(2) Accordingly, the independence of the programs is enhanced so that the programs can be uniformalized. The productivity of software can thus be improved.

(3) The automatic operation production flow is closed within the flowchart language program. Consequently, the know-how of the automatic operation can be concealed in the flowchart language program.

(4) Similarly, the know-how of machine operations can be closed within the ladder programs.

(5) The whole program can be structured to improve serviceability.

(6) The debug of each ladder program can individually be executed by means of the respective contacts of the manual operations. Consequently, debug efficiency can be improved.

Figure 5:
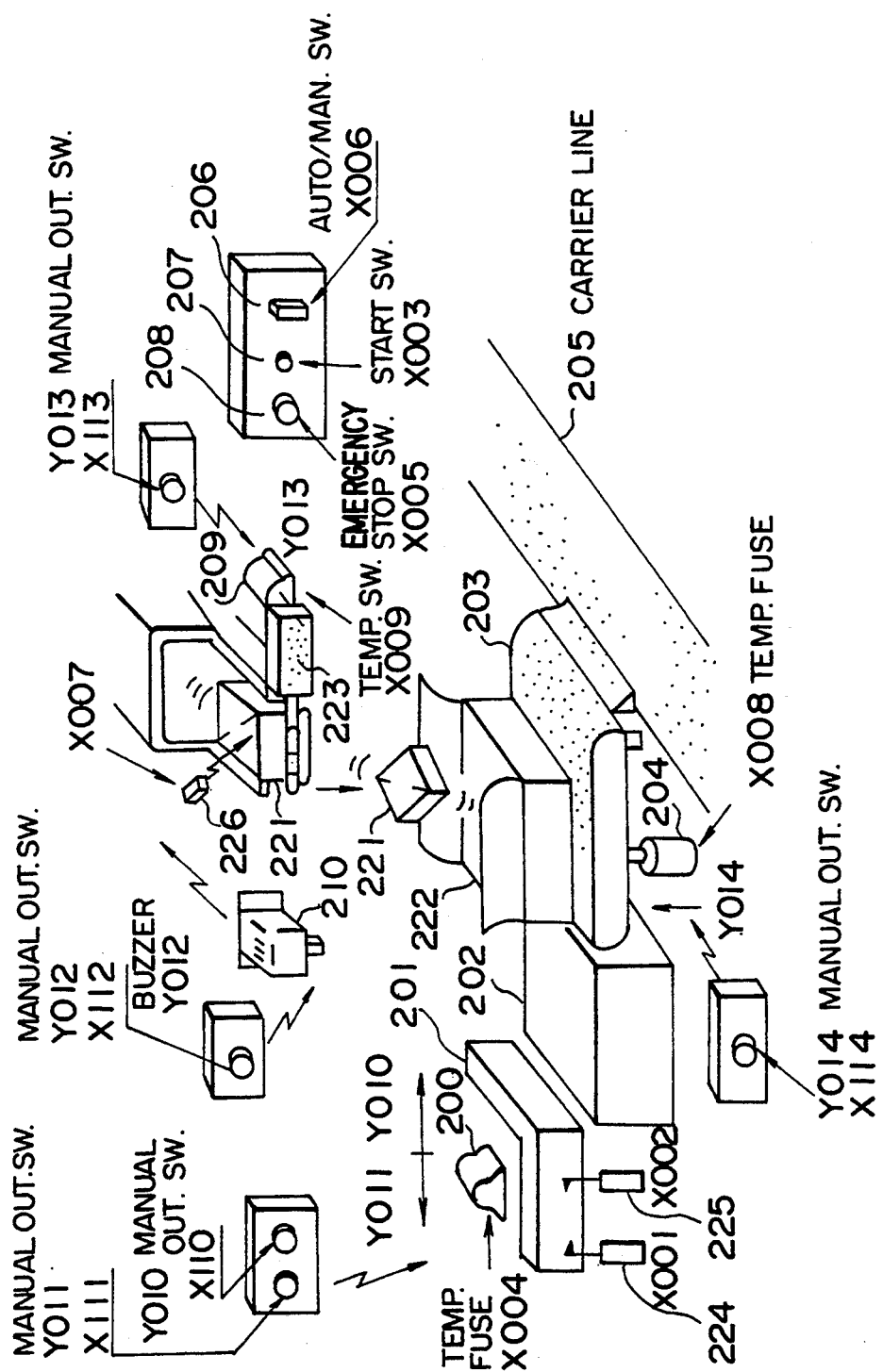
FIG. 5 is a view for explaining a specific system to which the present invention is applied.

FIG. 5 is a view showing the construction of a system according to another specific embodiment of the invention.

The system includes an extruder 201, a motor 200, limit switches 224 and 225, a casting port 202, a work table 203, a lifting machine 204, a carrier line 205, a product casting gate 223, a motor 209, a detector 226, a product request buzzer 210, an automatic-manual operation switch 206, an operation start switch 207 and an emergency stop switch 208. The extruder 201 extrudes a box 222. The motor 200 drives the extruder 201. The limit switches 224 and 225 detect forward and backward ends of the extruder 201, respectively. Placed on the casting port 202 is the box 222 for housing products 221. The lifting machine 204 lifts up the work table 203. The carrier line 205 carries the box 222 which has the products 221 therein. The gate 223 controls the timing for casting the product 221 into the box 222. The motor 209 drives the gate 223. The detector 226 detects the product 221 which has arrived at the gate 223. The buzzer 210 is operated to request a next product when the product 221 is cast into the box 222. The automatic-manual operation switch 206 changes over the automatic and manual operations of the above-mentioned devices. With the operation start switch 207 the operation of the system is started.

In FIG. 5, X001 to X009 and X110 to X114 are inputs from the system to the controller, and Y010 to Y014 are outputs from the controller to the system. More specifically, X001 is an input from the limit switch 224 and is turned ON when the extruder 201 is at the backward end. X002 is an input from the limit switch 225 and is turned ON when the extruder 201 is at the forward end. X003 is turned ON when the operation start switch 207 is turned ON. X004 is turned OFF when a thermal fuse is blown owing to the abnormal temperature of the motor 200. X005 is turned ON when the emergency stop switch 208 is turned ON. X006 is turned ON when the automatic operation is specified, and is turned OFF when the manual operation is specified by the automatic-manual operation switch 206. X007 is turned ON when the detector 226 detects that the product 221 arrives at the gate 223. X008 is turned OFF when the thermal fuse is blown owing to the abnormal temperature of the lifting machine 204. X009 is turned OFF when the thermal fuse is blown owing to the abnormal temperature of the motor 109. X110 to 114 are turned ON when the respective switches are turned ON.

Y010 is an output for moving the extruder 201 in a direction of the forward end. Y011 is an output for moving the extruder 201 in a direction of the backward end. Y012 is an output for operating the buzzer 210. Y013 is an output to the motor 209 for opening the gate 223. Y014 is an output to the lifting machine 204 for lifting up the work table 203.

Figure 6:
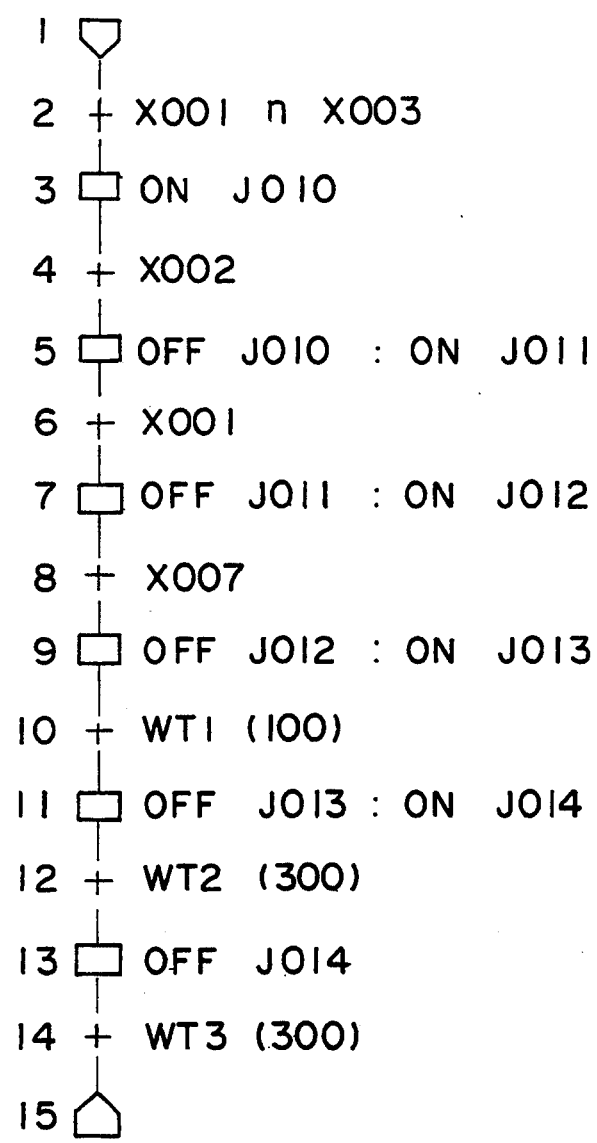
FIG. 6 is a view for explaining an example of the flowchart language program which controls the automatic operation flow of the system shown in FIG. 5.

FIG. 6 is a flowchart program for controlling the automatic operation shown in FIG. 5.

In FIG. 6, ▽ denotes the start of the program, ⊢ denotes a state waiting for a condition, ⊏⊐ denotes an output, △ denotes the end of the program, and ∩ denotes an AND condition.

There will be described the flow of the automatic operation shown in FIG. 5 with reference to FIG. 6.

(1) At first, the extruder 201 is stationary at the backward end.

(2) Wait at the backward end (X001) until the operation start switch (X003) is turned ON.

(3) When the condition (2) is once met, activate a ladder (FIG. 7) for forward movement of the extruder 201 (J010).

(4) Wait until the forward end (X002) is reached.

(5) When the condition (4) is once met, activate a ladder (FIG. 8) for backward movement of the extruder 201 (J011).

(6) Wait until the backward end (X001) is reached.

(7) When the Condition (6) is once met, stop the backward movement (J011 OFF) and operate the buzzer (FIG. 9) (J012).

(8) Wait until the product arrives (X007 ON).

(9) Stop the operation of the buzzer and activate a ladder for opening the gate (FIG. 10) (J013).

(10) Wait for ten seconds until the product drops down (a numeral in a parenthesis represents the number of 0.1 seconds).

Figure 11:
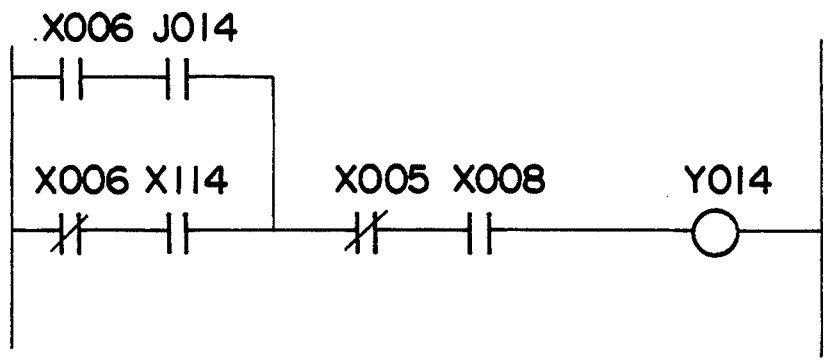

(11) Close the gate (J013 OFF), lift up the work table (J014) and then start to drop the packed product onto the carrier line (FIG. 11).

(12) Wait for 30 seconds until the packed product is dropped onto the carrier line.

(13) Bring down the work table (J014 OFF).

(14) Wait for 30 seconds until the work table returns to its original position.

(15) Return to (1).

FIGS. 7 to 11 show ladder programs, in which ╼╀╾ denote an A contact, ╼╫╾ denotes a B contact and ╼◯╾ denotes an output coil.

Figure 7:
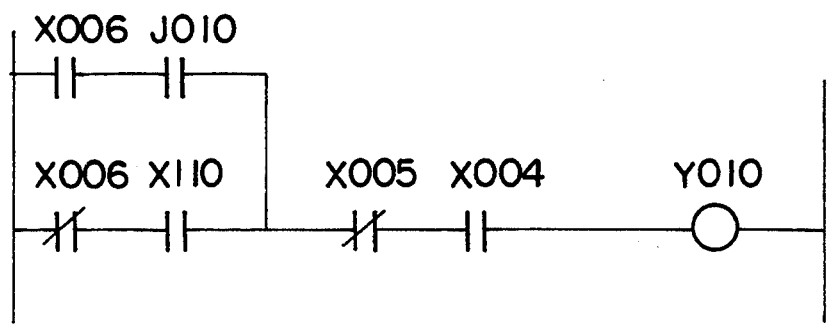
FIGS. 7 to 11 are views for explaining examples of the ladder programs which control the operation of individual machines of the system shown in FIG. 5.

FIG. 7 shows a ladder program for moving the extruder 201 forward. At the time of the automatic operation, X006 is turned ON. Accordingly, J010 is activated by the flowchart program (J010 ON) to turn ON an output (Y010) for moving the extruder 201 forward when the emergency stop switch 208 is turned OFF (X005 OFF) and the temperature of the motor 200 is not abnormal (X004 ON).

At the time of the manual operation, X006 is turned OFF. Accordingly, a Y010 manual output switch is turned ON (X110 ON) so that the output (Y010) for moving the extruder 201 forward can be turned ON (the extruder 201 can be moved forward) when the emergency stop switch 208 is turned OFF (X005 OFF) and the temperature of the motor 200 is not abnormal (X004 ON).

Figure 8:
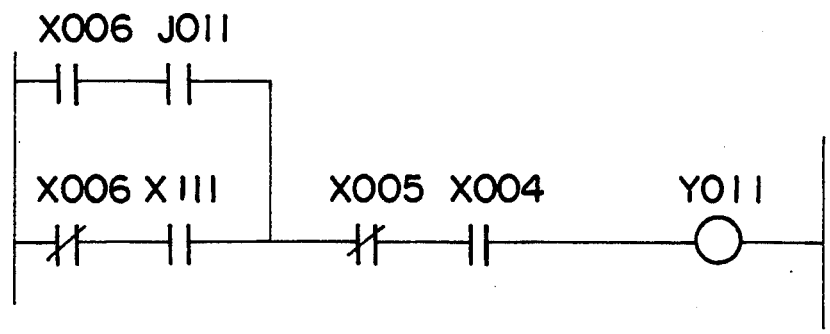

FIG. 8 shows a ladder program for moving the extruder 201 backward. At the time of the automatic operation, X006 is turned ON. Accordingly, J011 is activated by the flowchart program (J011 ON) to turn ON an output (Y011) for moving the extruder 201 backward (move the extruder 201 backward) when the emergency stop switch 208 is turned OFF (X005 OFF) and the temperature of the motor 200 is not abnormal (X004 ON).

At the time of the manual operation, X006 is turned OFF. Accordingly, a Y011 manual output switch is turned ON (X111 ON) so that the output (Y011) for moving the extruder 201 backward can be turned ON (the extruder 201 can be moved backward) when the emergency stop switch 208 is turned OFF (X005 OFF) and the temperature of the motor 200 is not abnormal (X004 ON).

Figure 9:
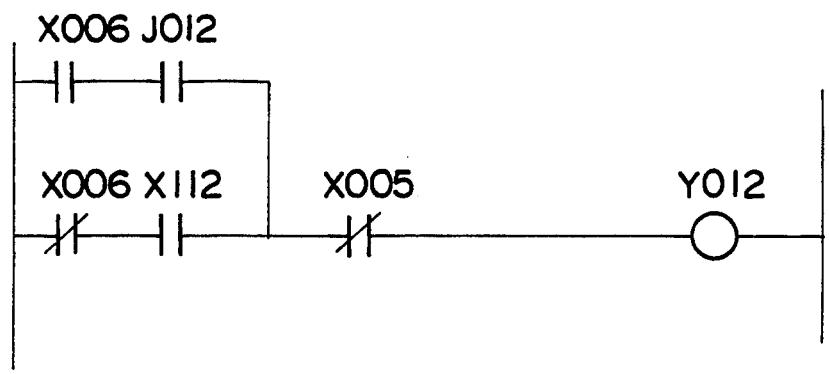

FIG. 9 shows a ladder program for operating the buzzer 210. At the time of the automatic operation, X006 is turned ON. Accordingly, J012 is activated by the flowchart program (J012 ON) to turn ON a buzzer output (Y012) (operate the buzzer) when the emergency stop switch 208 is turned OFF (X005 OFF).

At the time of the manual operation, X006 is turned OFF. Accordingly, a Y012 manual output switch X112 is turned ON (X112 ON) so that the buzzer output (Y012) can be turned ON (the buzzer can be operated) when the emergency stop switch 208 is turned OFF (X005 OFF).

Figure 10:
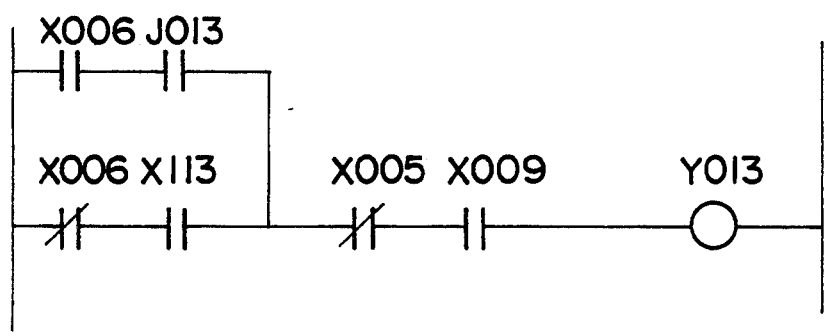

FIG. 10 shows a ladder program for opening the gate 223. At the time of the automatic operation, X006 is turned ON. Accordingly, J013 is activated by the flowchart program (J013 ON) to turn ON an output (Y013) for opening the gate 222 (open the gate 222) when the emergency stop switch 208 is turned OFF (X005 OFF) and the temperature of the motor 209 is not abnormal (X009 ON).

At the time of the manual operation, X006 is turned OFF. Accordingly, a Y013 manual output switch is turned ON (X113 ON) so that the output (Y013) for opening the gate 222 can be turned ON (the gate 222 can be opened) when the emergency stop switch 208 is turned OFF (X005 OFF) and the temperature of the motor 209 is not abnormal (X009 ON).

FIG. 11 shows a ladder program for lifting up the work table 203. At the time of the automatic operation, X006 is turned ON. Accordingly, J014 is activated in accordance with the flowchart program (J014 ON) to turn ON an output (Y014) for lifting up the working table 203 (lift up the work table 203) when the emergency stop switch 208 is turned OFF (X005 OFF) and the temperature of the lifting machine 204 is not abnormal (X008 ON).

At the time of the manual operation, X006 is turned OFF. Accordingly, a Y014 manual output switch is turned ON (X114 ON) so that the output (Y014) for lifting up the working table 203 can be turned ON (the working table 203 can be lifted up) when the emergency stop switch 208 is turned OFF (X005 OFF) and the temperature of the lifting machine 204 is not abnormal (X008 ON).

According to the present embodiment, the ladder programs define controls including processing for trouble and interlocks which are inherent in the devices forming the system, and the manual operation is selected (X006 OFF) so that the trial operations of the devices can be completed by means of the ladder programs. When the automatic operation is then selected (X006 ON), the whole system can be controlled by means of the flowchart program which defines the whole production flow.

When a trouble has occurred to the system, the manual operation can be selected (X006 OFF) to operate the devices by means of the manual switches. Consequently, the partial operation of the system can manually be continued.

According to the present invention, it is possible to create the ladder programs and the flowchart language program in parallel (FIGS. 2 and 3). The ladder programs are separated from the flowchart language program at manual operation contacts thereof, so that the actual machine test of the ladder programs can be completed. In addition, the whole program has the 2-hierarchical structure which is comprised of ladder programs and flowchart language program, thereby enhancing the independence of the program so that the programs can be uniformalized and the programs can be reused.

Thus, the productivity of the programs can be improved.

An example of parallel execution of the flowchart language program and the ladder programs, referring to FIG. 4, is described as follows. The flowchart language processor initially reads from the flowchart language program memory and the ladder processor initially reads from the ladder program memory. If all initial conditions are satisfied, the flowchart processor begins. As the flowchart processor is working on the overall system operation, the ladder processor is simultaneously working on object specific operation. As the flowchart processor is instructed, by the program, to control an object, the flowchart processor prompts the ladder processor to engage the object specific tasks to accomplish the instructed operation. While the ladder processor is accomplishing the specific tasks, the flowchart processor then simultaneously processes the next system instruction. When the next system instruction requires a control of an object, the flowchart processor prompts the ladder processor to engage the object specific tasks to accomplish the instructed operation. While the ladder processor is accomplishing the second task, the flowchart processor then simultaneously processes the next instruction. This parallel execution of the program continues until all instructions are completed.

Moreover, according to the present invention, the whole program is structured to thereby simplify the entire structure of the program so that the serviceability of the programs can be improved. In addition, the know-how of the automatic operation production flow can be closed in the flowchart language program, while the know-how of the machine operation can be closed in the ladder programs, improving the security of the programs.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is:

1. A method of combining a flowchart language program with a plurality of ladder programs for controlling objects in a process, said method comprising the steps of:
   creating a plurality of ladder programs for controlling respective ones of said objects, each ladder program including an automatic contact, an automatic enabling contact, a manual contact and a manual enabling contact;
   creating a flowchart language program including commands such that said commands sequentially activate said automatic contacts for automatic operation of said process; and
   combining said ladder programs and said flowchart language program;
   said automatic enabling contact being defined in each ladder program such that said automatic enabling contact is activated to enable the activation of said automatic contact during said automatic operation which is selected by an automatic/manual selection switch;
   said manual contact being defined in each ladder program such that said manual contact is activated by a manual switch in a manual operation which is selected by said automatic/manual selection switch;
   said manual enabling contact being defined in each ladder program such that said manual enabling contact is activated to enable the activation of said manual contact during said manual operation which is selected by said automatic/manual selection switch;
   said combining step includes the steps of:
   permitting execution of said flow chart language program, and
   permitting execution of said ladder programs in response to execution of said flowchart language program when said automatic operation is selected and independent execution of said ladder programs when manual operation is selected.

2. The method according to claim 1, further comprising the step of:
   executing said flowchart language program in parallel with said plurality of ladder programs when controlling said process.

3. The method according to claim 1, wherein said flowchart language program further includes commands for waiting for the results of said ladder programs.

4. The method according to claim 1, wherein said flowchart language program further includes a command for waiting for a lapse of a predetermined time.

5. The method according to claim 1, wherein each of said ladder programs further includes a contact for an interlock which enables the operation of said ladder program under a respective predetermined condition of said process.

6. A controller for controlling operations of objects in a process by the use of a flowchart language program and a plurality of ladder programs, said controller comprising:
   an automatic/manual selection switch for selecting one of an automatic operation and a manual operation of said process;
   first storage means for storing said flowchart language program which defines a whole flow of said automatic operation by using a first type of commands which sequentially activate automatic contacts for said automatic operation and a second type of commands which provide waits for said results of executions of said ladder programs;
   a first processor for executing said flowchart language program which is stored in said first storage means;
   a plurality of manual switches each provided for manual operation of a respective one of said objects;
   second storage means for storing said plurality of ladder programs each including a respective one of said automatic contacts, and being defined to control operation of a respective object such that the operation is started by activation of the respective one of said automatic contacts during automatic operation and started by a respective manual switch during manual operation;
   a second processor for sequentially and repeatedly executing said plurality of ladder programs stored in said second storage means in response to execution of said flowchart language program by said first processor when automatic operation is selected and independently executing said ladder programs in response to activation of said manual switches when manual operation is selected; and
   third storage means, including a storage area accessible by said first and second processors, for storing information to be transferred between said first and second processors and between said objects and said processors such that requests for activations of said automatic contacts are notified from said first processor to respective ladder programs while results of executions of said ladder programs are notified from said objects to said first processor during automatic operation.

7. The controller according to claim 6, wherein said results of execution of said ladder programs include outputs to sensors or switches which are influenced by said results of executions of said ladder programs.

8. A controller, for controlling an apparatus of a manufacturing process having a memory and a processor, comprising:
   a memory for storing a flowchart language program and a ladder program which represent a control sequence of said apparatus of a manufacturing process, said ladder program including automatic and manual contacts each being selectable by an automated manual selection switch, said automatic contact when selected causes automatic operation of said apparatus in response to execution results of said flowchart language program, said manual contact when selected causes manual operation of said apparatus independent of said flowchart language program;

a first processor for executing said flowchart language program; and a second processor for executing said ladder program in response to execution of said flowchart language program by said first processor when said automatic contact is selected and independently executing said ladder program when said manual contact is selected;

wherein said first processor and said second processor operate simultaneously to parallel parallelly process said flowchart language program and said ladder program when said automatic contact is selected;

wherein results of said first and second processor comprise signals which are communicated to sensors or switches which are influenced by said results.

* * * * *